US007810038B2

(12) United States Patent
Matsa et al.

(10) Patent No.: US 7,810,038 B2
(45) Date of Patent: Oct. 5, 2010

(54) METHOD FOR MODIFYING A GUI FOR AN APPLICATION

(75) Inventors: Moshe E. Matsa, Cambridge, MA (US); Julius Q. Quiaot, San Jose, CA (US); Christopher D. Spitzer, Berkeley, CA (US); Christopher R. Vincent, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 2333 days.

(21) Appl. No.: 10/138,119

(22) Filed: May 3, 2002

(65) Prior Publication Data

US 2003/0206195 A1    Nov. 6, 2003

(51) Int. Cl.
*G06F 3/00* (2006.01)
(52) U.S. Cl. .................. 715/765; 715/744; 715/747; 715/763
(58) Field of Classification Search .................. 715/744, 715/747, 763, 765, 788
See application file for complete search history.

(56) References Cited

U.S. PATENT DOCUMENTS

| 5,533,183 A | * | 7/1996 | Henderson et al. .......... 715/854 |
| 5,796,401 A | | 8/1998 | Winer |
| 5,917,483 A | | 6/1999 | Duncan et al. |
| 5,956,736 A | | 9/1999 | Hanson et al. |
| 6,002,402 A | * | 12/1999 | Schacher .................... 715/810 |
| 6,031,527 A | * | 2/2000 | Shoji et al. .................. 715/804 |
| 6,201,539 B1 | | 3/2001 | Miller et al. |
| 6,222,537 B1 | | 4/2001 | Smith et al. |
| 6,300,949 B1 | * | 10/2001 | Shudo et al. ................ 715/744 |

FOREIGN PATENT DOCUMENTS

| EP | 0662655 A2 | 7/1995 |
| GB | 2348520 A | 10/2000 |
| WO | WO 96/19779 | 6/1996 |

* cited by examiner

*Primary Examiner*—Dennis Bonshock
(74) *Attorney, Agent, or Firm*—Stephen Bongini; Fleit Gibbons Gutman Bongini & Bianco PL (57) ABSTRACT

A method, system and computer readable medium for providing an editing mode for a graphical user interface (GUI) is described. A toggle widget is provided to a user of a GUI during execution of the application presenting the GUI. When the user presses the toggle widget, the GUI is placed in an editing mode, whereby the normal functions of all of the widgets of the GUI, except for the toggle widget, are suspended. While in editing mode, the user is allowed to modify the locations of all of the widgets of the GUI, except for the toggle widget. The user subsequently modifies the locations of widgets of the GUI. Then, the user presses the toggle widget again and the GUI is exited from editing mode. Once exited from editing mode, the normal functions of all of the widgets of the GUI are restored and the new locations of the widgets are fixed.

23 Claims, 8 Drawing Sheets

METHOD FOR MODIFYING A GUI FOR AN APPLICATION

BACKGROUND OF THE INVENTION

1. Field of the Invention

The present invention relates to the field of graphical user interfaces and, more specifically, to the field of editing graphical user interfaces.

2. Description of Related Art

At the advent of the personal computer, the command line interface was introduced as the medium for interacting with a computer. The command line interface, however, was difficult for the novice to use and was not user-friendly. Soon after, the graphical user interface (GUI) was introduced. Today, the GUI is the standard for applications and operating systems. GUIs allow users to quickly and easily interact with an application or an operating system via, among other things, a mouse, using the point-and-click method. In addition, GUIs allow users to visually monitor the functions and operations of an application or an operating system. Current GUIs, however, do not come without drawbacks.

Typically, a GUI consists of a variety of widgets including buttons, text fields, text areas, pull-down menus, scroll bars and images. These widgets, however, are normally stationary and cannot be rearranged at runtime. That is, while the application behind the GUI is running, the user cannot rearrange the widgets as he sees fit. One approach to this problem provides a system-wide or application-wide mode whereby functions can be added or deleted from a GUI. However, this approach does not allow for all widgets on a GUI to be rearranged—only a selected group. Another approach to this problem involves allowing the user of a GUI to customize toolbars. This well known feature allows a user to bring up an editor window and rearrange widgets on toolbars in the GUI. This feature, however, does not allow all widgets to be rearranged—only a select group. Furthermore, this feature requires an additional editor window to be displayed, which can cause screen clutter and confuse the user.

Accordingly, there exists a need to overcome these drawbacks with a simple method for rearranging widgets in a GUI.

SUMMARY OF THE INVENTION

A method, system and computer readable medium for modifying a graphical user interface (GUI) for an application is described. In an embodiment of the present invention, a toggle widget is provided to a user of a GUI during execution of the application presenting the GUI. When the user presses the toggle widget, the GUI is placed in an editing mode, whereby the normal functions of all of the widgets of the GUI, except for the toggle widget, are suspended. While in editing mode, the user is allowed to modify the locations of any of the widgets of the GUI, except for the toggle widget. The user subsequently modifies the locations of widgets of the GUI. Then, the user presses the toggle widget again and the GUI is exited from editing mode. Once exited from editing mode, the normal functions of all of the widgets of the GUI, except for the toggle widget, are restored.

One advantage of the present invention is the quick and easy placement of the GUI into an editing mode. In an embodiment of the present invention, the GUI can be placed in the editing mode by simply pressing a toggle widget that is immediately present on the GUI upon execution of the application presenting the GUI. In another embodiment of the present invention, the GUI is immediately placed in editing mode upon pressing of the toggle widget and, in addition, no other GUIs are presented after pressing of the toggle widget and before the GUI is placed in editing mode. These features provide for a more efficient handling of the GUI and leads to increased user-friendliness of the GUI.

Another advantage of the present invention is the simple and fast method for modifying the GUI. The GUI allows for mouse-driven drag-and-drop modification of the locations of widgets of the GUI. This feature increases the user-friendliness of the GUI. In addition, the GUI allows the user to modify the GUI during runtime without necessitating the user to shut down and restart the application or the operating system. This feature facilitates on-the-fly modification of the GUI.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION OF PREFERRED EMBODIMENTS

The present invention is described in terms of the exemplary embodiments below. This is for convenience only and is not intended to limit the application of the present invention. In fact, after reading the following description, it will be apparent to one of ordinary skill in the relevant art(s) how to implement the present invention in alternative embodiments.

Figure 1:
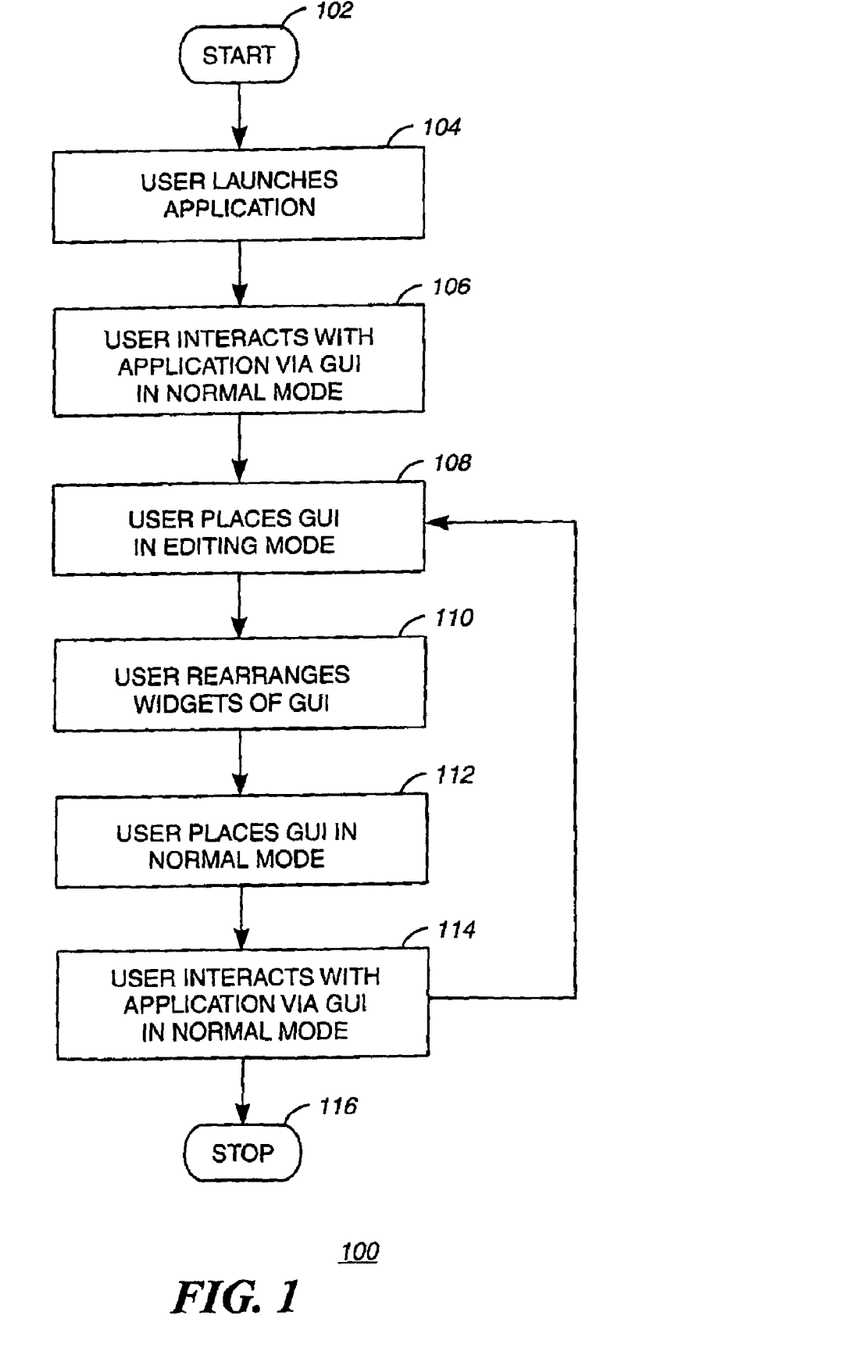
FIG. 1 is a flowchart depicting the overall operation and control flow of one embodiment of the present invention.

FIG. 1 is a flowchart depicting the overall operation and control flow 100 of one embodiment of the present invention. Flow 100 shows generally how the editing mode feature of the present invention can be used in conjunction with an application presenting a GUI. Control flow 100 begins with step 102 and flows directly to step 104.

In step 104, the computer user launches the application presenting the GUI. The user launches the application by double-clicking the application icon, calling the application in a command line, or calling the application from another application or in a batch file. In an embodiment of the present invention, the application is an instant messaging application such as Yahoo Messenger, America Online Instant Messenger, IBM SameTime Connect or any other computer application program for instantly communicating with other computer users running such a program. In another embodiment of the present invention, the application is a word processor, a web browser, a spreadsheet application, a presentation editor, a music player, a graphic art editor, or an email application.

In an embodiment of the present invention, the application launched in step 104 is a self-contained application that may be executed on a computer system without requiring the assistance of any other application, other than the operating system or common files and libraries. That is, in order to execute properly on a computer system, the application does not require that any other application also be executed on the computer system (with the exceptions noted). In this embodiment, the application is a self-contained, end-user application program that may be executed on any computer running the appropriate operating system and having the standard files and libraries.

For example, in order to execute properly on a computer system, the application does not require that a scripting translator (such as the PERL programming environment, the MS Visual Basic programming environment or the HyperCard programming environment for the Macintosh operating system) is also executed on the computer system to provide support to the application. In another example, the application does not require that a compiler or other programming application (such as the MS Visual C++ programming environment, the MS Visual J++ programming environment or the CodeWarrior programming environment) is also executed on the computer system to provide support to the application. In these examples, the application is a file such as an executable file that can be properly executed on the computer of the user without requiring the use of any of the above secondary applications.

In step 106, the user interacts with the application via the GUI. Normal operation of the application and the GUI will be deemed to be in "normal mode." Using the example of the instant messaging application, in this step the user communicates with another user via the GUI of the instant messaging application. The user sends and receives text messages that are transmitted between the user and a partner.

In step 108, the user places the GUI in editing mode by indicating to the application his intention to do so. The term "widget," as used by those of ordinary skill in the art of GUI programming, refers to any GUI element. Examples of a widget are: a text field, a button, a pull-down menu, a scroll bar, a pane and a radio button. In an embodiment of the present invention, the user places the GUI in editing mode by pressing a toggle widget or any other widget in the GUI. A toggle widget is a widget which toggles between two modes when the widget is pressed by a user. Examples of a toggle widget are: a button, a pair of radio buttons and a switch.

In another embodiment of the present invention, the user places the GUI in editing mode by performing a specific keystroke or keystrokes. While in editing mode, the normal functions of all of the widgets of the GUI, except for the toggle widget, are suspended. That is, when the user attempts to activate a widget using a mouse-click or any other method, the widget does not react normally. Rather, the widget takes no action at all. The lack of action, however, does not apply to the toggle widget used to place the application in editing mode. Further, while in editing mode, the user is able to rearrange all of the widgets of the GUI, except for the toggle widget. This is explained in greater detail below. This process continues until the application is no longer in editing mode.

In an embodiment of the present invention, the position of the toggle widget can be modified while in editing mode. In this embodiment, the user can click and drag the toggle widget to a new location in the GUI, while in editing mode. Note, however, that certain restrictions on the position of the toggle widget would apply in this embodiment. For example, one restriction would require that the toggle widget is viewable at all times during editing mode, such that the user can access the toggle widget and exit editing mode.

In an embodiment of the present invention, more than one toggle widget is present on the GUI. In this embodiment, the placement of the application in editing mode suspends the normal functions of all of the widgets of the GUI, except for the toggle widgets. Further, while in editing mode, the user is able to rearrange all of the widgets of the GUI, except for the toggle widgets.

In step 110, the user proceeds to rearrange the widgets of the GUI. In the preferred embodiment, the user utilizes the mouse, to drag-and-drop all of the widgets of the GUI anywhere in the working area of the GUI. In another embodiment, the user may press a specific keystroke or keystrokes to select or deselect a widget to be moved, as well as to perform the actual placement. For example, the user may press the Tab key to select a widget; once a widget is selected, the user may press the cursor keys to move the widget anywhere in the working area.

In step 112, the user restores the GUI to normal mode by indicating to the application his intention to do so. In an embodiment of the present invention, the user places the GUI in normal mode by pressing the toggle widget or any other widget in the GUI. In another embodiment of the present invention, the user places the GUI in normal mode by pressing a specific keystroke or keystrokes.

In step 114, the user resumes interacting with the application via the GUI in normal mode. In step 114, the new arrangement of the widgets of the GUI are now fixed. In an embodiment of the present invention, control flows back to step 108. In this embodiment, the user repeatedly operates the GUI in normal mode, rearranges the widgets of the GUI in editing mode and resumes operation of the GUI in normal mode. In another embodiment of the present invention, control flows to step 116. In this embodiment, the application is exited by the user. In step 116, control flow 100 ceases.

In an embodiment of the present invention, the locations of the widgets in the GUI are stored or maintained persistently. In this embodiment, information pertaining to the locations of the widgets in the GUI is stored on a hard disk or on removable media storage, such as a floppy disk or a CD. In another embodiment, the locations of the widgets in the GUI are not stored persistently and revert to default locations upon restarting the application of the GUI.

Flow 100 executes on any computer system for executing computer application programs. Such a computer system is described in greater detail below. In an embodiment of the present invention, flow 100 executes on a personal computer (PC) (e.g., an IBM or compatible PC workstation running the Microsoft Windows 95/98/2000/CE/NT/XP operating system or the LINUX operating system, a Macintosh computer running the Mac OS operating system, or a SUN workstation running the UNIX operating system), a Personal Digital Assistant (PDA) (e.g., a PalmPilot running the Palm OS operating system), a game console (e.g., a Microsoft Xbox console or a Sony Playstation 2 console) or interactive television.

Figure 2A:
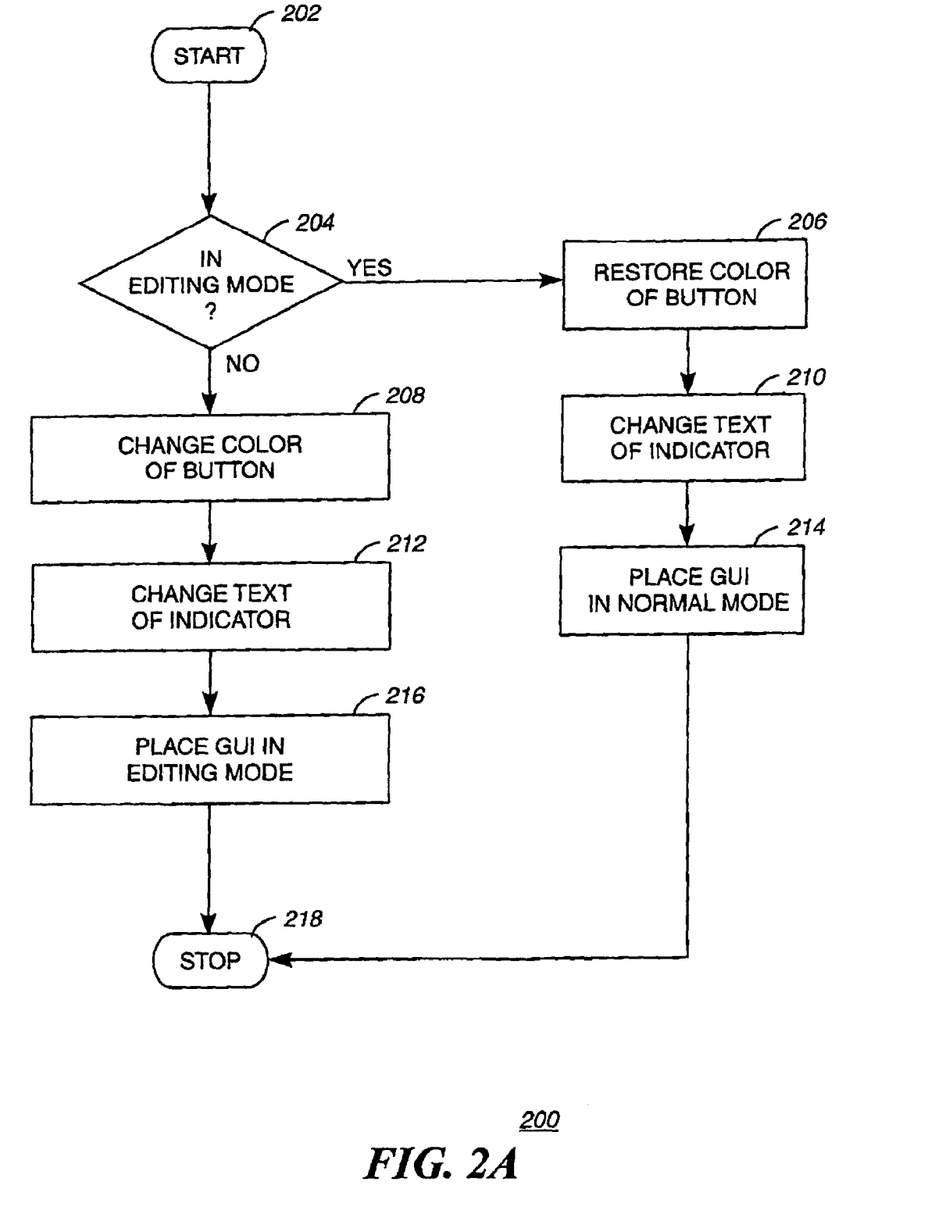
FIG. 2A is a flowchart depicting the operation and control flow of the behavior of a GUI process upon toggling of a toggle button, in one embodiment of the present invention.
Figure 2B:
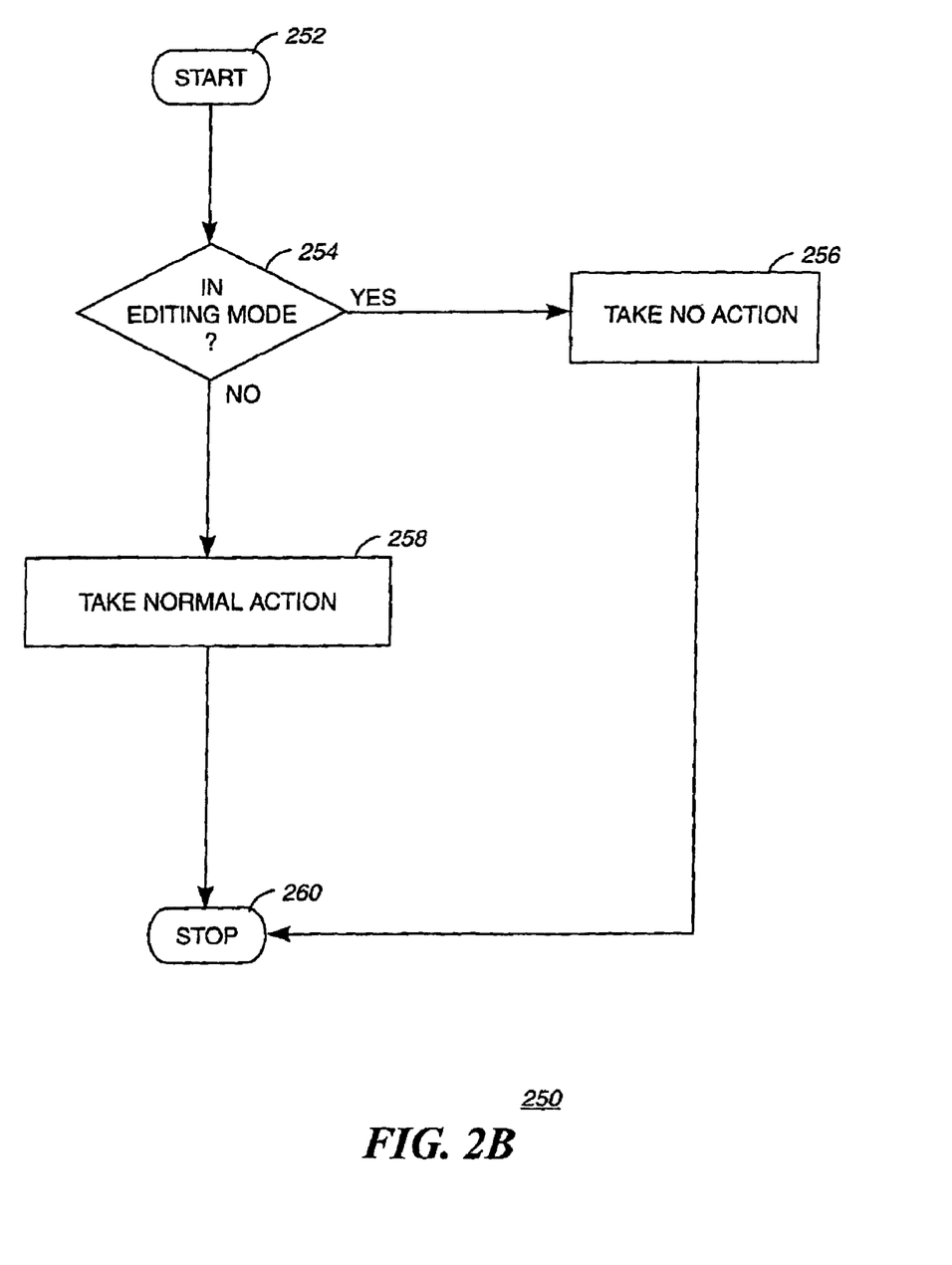
FIG. 2B is a flowchart depicting the operation and control flow of the behavior a GUI process upon interaction with a GUI component, in one embodiment of the present invention.

More detailed descriptions of the steps of flow 100 are shown in the flowcharts of FIGS. 2A and 2B.

Figure 3:
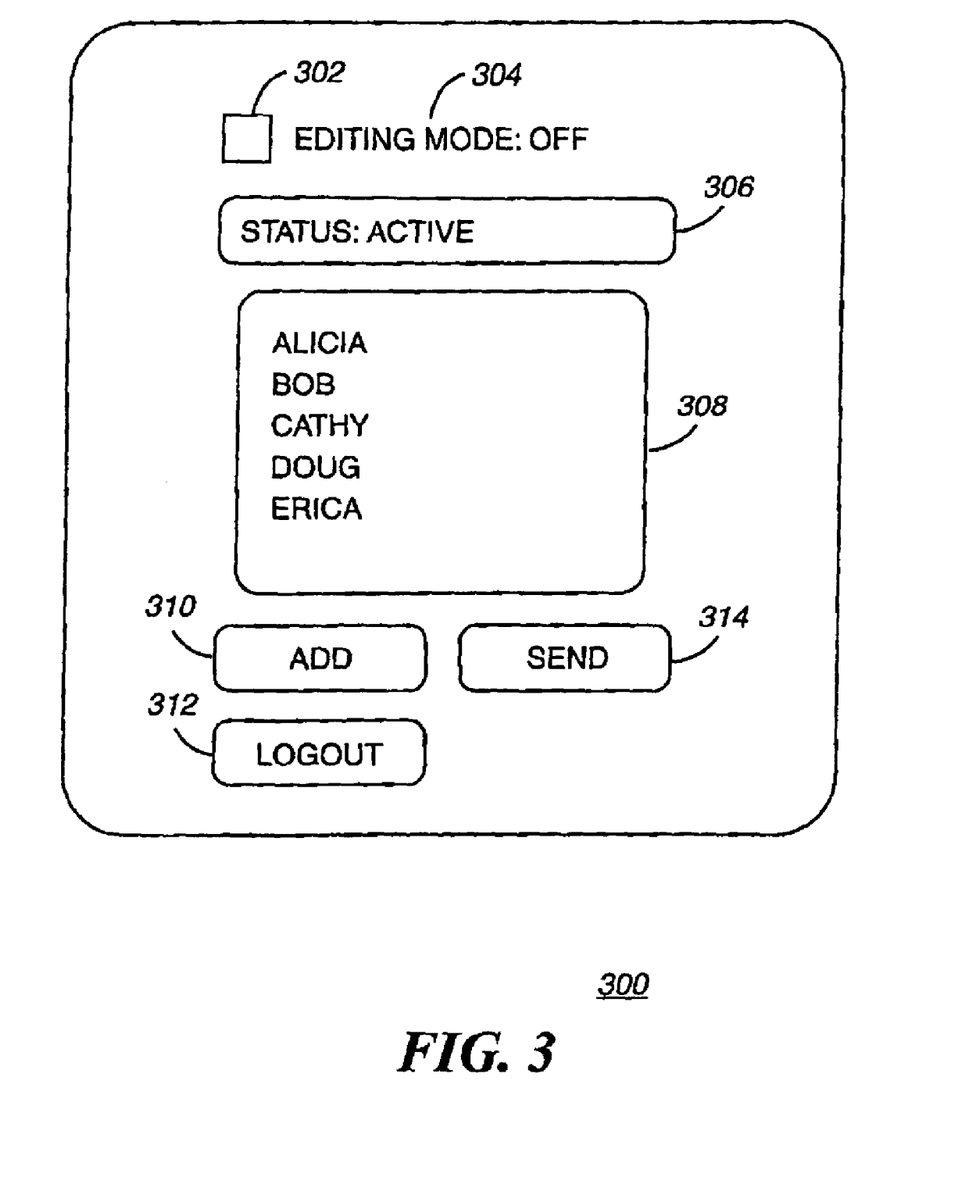
FIG. 3 is an illustration of a GUI in normal mode, in one embodiment of the present invention.

FIG. 3 is an illustration of a GUI 300 in normal mode, in one embodiment of the present invention. GUI 300 is an example GUI presented by an application launched by the user in step 104 of flow 100. In this example, GUI 300 is an instant messaging application utilized by the user for instant communication with a partner.

GUI 300 shows typical GUI widgets associated with an instant messaging GUI. GUI 300 includes a status indicator 306 for showing the status of the application. Indicator 306 shows that the status of GUI 300 is "active," which indicates that the application is currently connected to the appropriate instant messaging server and that it is ready to communicate.

GUI 300 also includes a buddy window 308 for displaying a list of partners, or "buddies," which the user can select for communication. GUI 300 also includes buttons 310, 312 and 314. Button 310 is pressed when the user desires to add a new buddy to the buddy window 308. Button 314 is pressed when the user has selected a buddy in window 308 and he desires to communicate with that buddy. Pressing button 314 causes the application to present another GUI which is used for exchanging text messages between the user and the selected buddy. Button 312 is pressed when the user desires to log out or exit the application. Pressing this button causes the application to cancel its connection with the instant messaging server and exits the application.

GUI 300 also includes button 302 (the toggle widget of step 108 of flow 100 for placing the application in editing mode), and the corresponding indicator 304. Button 302 is used to toggle between normal mode and editing mode. That is, each time button 302 is pressed, the application toggles between normal mode and editing mode. This function is described in greater detail below. In an embodiment of the present invention, the toggle widget of the GUI 300 is a widget that is immediately present on the GUI 300 upon launch of the application in step 104. That is, the toggle widget is not hidden within another widget, such as a pull-down menu, and the user need not navigate through any other widgets or GUIs in order to access the toggle widget. The toggle widget is immediately accessible, such as with one click of the mouse. Further, the toggle widget continues to be available in the same way throughout the use of the GUI 300. Thus, the toggle widget remains immediately accessible on the GUI 300 throughout steps 106 through 114.

Indicator 304 indicates the mode of the application. GUI 300 shows indicator 304 displaying "Editing Mode: Off," which indicates that the application is currently not in editing mode, but rather in normal mode. The manner in which indicator 304 changes is described in greater detail below.

Figure 4:
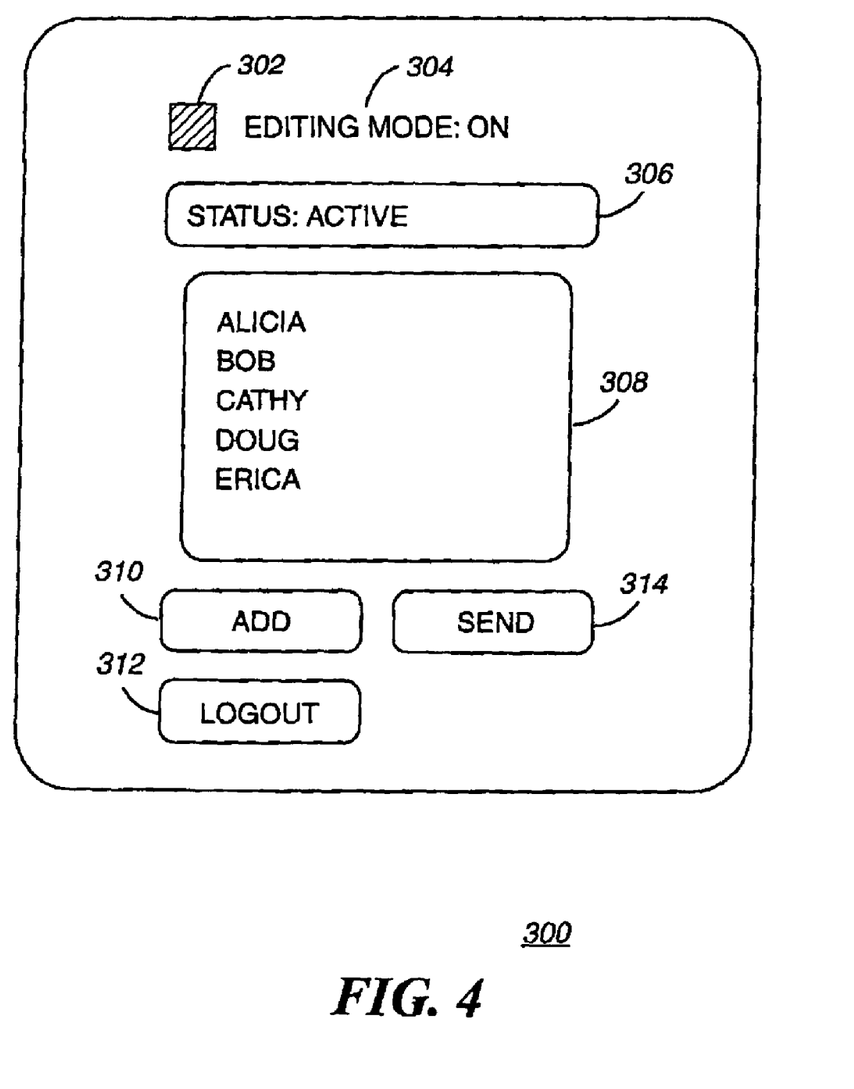
FIG. 4 is an illustration of the GUI of FIG. 3 in editing mode, in one embodiment of the present invention.

FIG. 4 is an illustration of the GUI 300 of FIG. 3 in editing mode, in one embodiment of the present invention. FIG. 4 shows the state of GUI 300 of FIG. 3 after being placed in editing mode by the user in step 108 of flow 100. FIG. 4 shows that indicator 304 has changed to indicate that the application is in editing mode. Thus, the indicator 304 displays "Editing Mode: On." Furthermore, FIG. 4 shows that button 302 has changed color as a result of the application being in editing mode. Button 302 retains this color only while in editing mode. Once GUI 300 has returned to normal mode, the button 302 is restored to its original color.

Note that the appearance of GUI 300 while in editing mode is identical to the appearance of GUI 300 while in normal mode (except for the appearance of the indicator 304. This is advantageous because it allows a user to see the appearance of the GUI 300 exactly as it would appear during operation.

Figure 5:
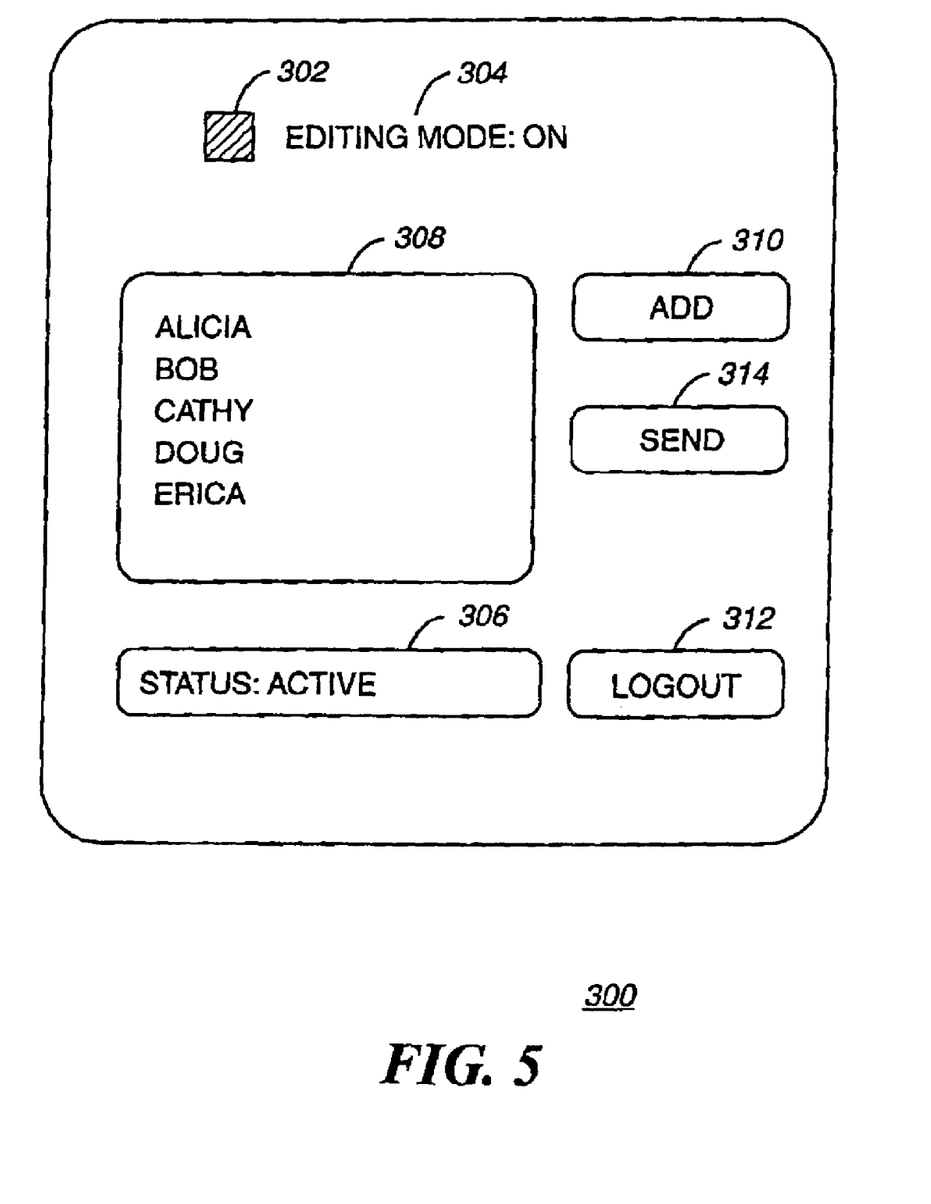
FIG. 5 is an illustration of the GUI of FIG. 3 in editing mode after modification of the locations of widgets, in one embodiment of the present invention.

FIG. 5 is an illustration of the GUI 300 of FIG. 3 in editing mode after modification of the locations of widgets, in one embodiment of the present invention. FIG. 5 shows the state of GUI 300 of FIG. 3 after the widgets of GUI 300 have been rearranged by the user in step 110 of flow 100. FIG. 5 shows that indicator 304 continues to indicate that the application is in editing mode and button 302 continues to be colored. Furthermore, FIG. 5 shows that window 308 has been moved to the left of GUI 300 and buttons 310, 312 and 314 have been moved to the right of GUI 300. In addition, indicator 306 has been moved to the bottom of GUI 300 according to the user's preferences. In an embodiment of the present invention, while in editing mode, the user is allowed to modify the location of any of the widgets of the GUI 300, except for the toggle widget 302. Further, the user is allowed to place any of the modifiable widgets anywhere in the entire viewing area of GUI 300.

Figure 6:
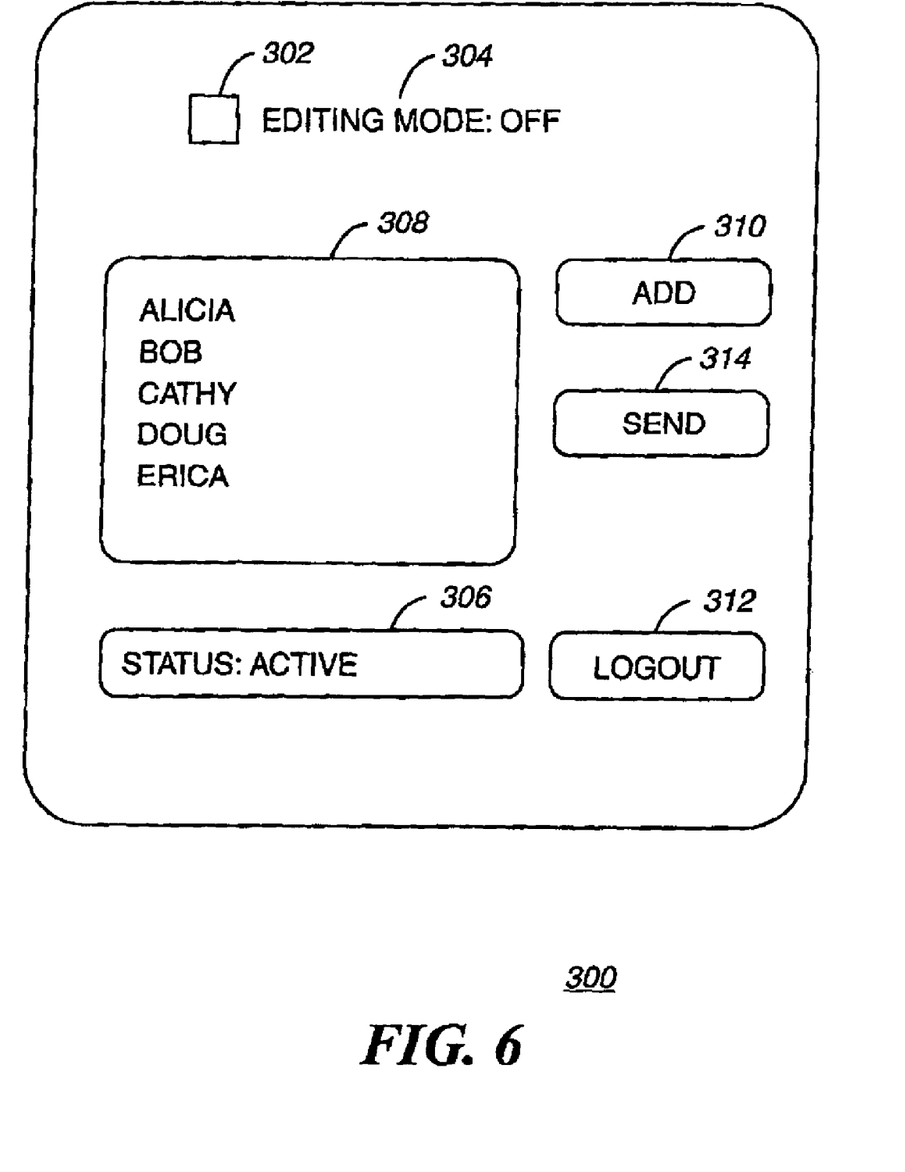
FIG. 6 is an illustration of the GUI of FIG. 3 in normal mode after modification of the locations of widgets, in one embodiment of the present invention.

FIG. 6 is an illustration of the GUI 300 of FIG. 3 in normal mode after modification of the locations of the widgets, in one embodiment of the present invention. FIG. 6 shows the state of GUI 300 of FIG. 3 after the widgets of GUI 300 have been rearranged by the user and the user has restored GUI 300 to normal mode in step 112 of flow 100. FIG. 6 shows that indicator 304 indicates that the application is no longer in editing mode, but rather in normal mode. In addition, FIG. 6 shows that button 302 has been restored to its original appearance, namely to its original color. Furthermore, FIG. 6 shows that the new arrangement of the widgets of GUI 300 is fixed.

FIG. 2A is a flowchart depicting the operation and control flow 200 of the behavior of a GUI process upon toggling of a toggle button, in one embodiment of the present invention. Flow 200 shows the process executed by the application when button 302 of GUI 300 FIG. 3 is pressed while GUI 300 is in different modes. More specifically, flow 200 shows the process executed by the application when the user presses button 302 in an attempt to place GUI 300 in editing mode in step 108 of flow 100 or in normal mode in step 112 of flow 100. Flow 200 begins with step 202 and flows directly to step 204.

In step 204, the application determines whether the application is in editing mode. If the result of this determination is affirmative, control flows to step 206. Otherwise, control flows to step 208.

In step 206, it has been determined that the application is already in editing mode. Therefore, the user desires to place GUI 300 in normal mode. In this step, the color of button 302 is restored to its original appearance, namely its original color. In step 210, the text of indicator 304 is changed from "Editing Mode: On" to "Editing Mode: Off" to indicate that the application is no longer in editing mode, but rather in normal mode. In step 214, the application is placed in normal mode. This step restores normal functions to the widgets of GUI 300. In addition, any new arrangement of widgets is now fixed.

In step 208, it has been determined that the application is not in editing mode, but rather in normal mode. Therefore, the user desires to place GUI 300 in editing mode. In this step, the color of button 302 is changed. In an embodiment of the present invention, the color of button 302 is changed to red. In step 212, the text of indicator 304 is changed from "Editing Mode: Off" to "Editing Mode: On" to indicate that the application is in editing mode, instead of normal mode. In step 216, the application is placed in editing mode. This step suspends normal functions of all of the widgets of GUI 300, except for button 302, and allows the user to rearrange all of the widgets of GUI, except for button 302.

In an embodiment of the present invention, although normal functions of widgets are suspended in step 216 above, the display functions of widgets are not affected. Thus, while in editing mode, widgets continue to display information as in normal mode. As an example, a buddy list window in a GUI of an instant messaging application continues to display the online status of buddies in the buddy list window while in editing mode.

In step 218, flow 200 ceases.

FIG. 2B is a flowchart depicting the operation and control flow 250 of the behavior a GUI process upon interaction with a GUI component, in one embodiment of the present invention. Flow 250 shows the process executed by the application when any widget of GUI 300, except button 302, is pressed. More specifically, flow 250 shows the process executed by the application when the user presses any widget of GUI 300, except button 302. Flow 250 determines whether or not the control flow of the application of GUI 300 is currently in a step after step 108 of flow 100 and before step 112 of flow 100. Flow 250 commences when the user presses any widget of GUI 300, except button 302. Flow 250 begins with step 252 and flows directly to step 254.

In step 254, the application determines whether the application is in editing mode. If the result of this determination is affirmative, control flows to step 256. Otherwise, control flows to step 258. In step 258, it is determined that the application is not in editing mode, but rather in normal mode. In this case, the widget of GUI 300 pressed by the user operates normally. That is, the widget takes normal action. For example, if button 312 of GUI 300 was pressed while the application was in normal mode, the application would proceed to log the user out of the application and the application would exit. In step 256, it is determined that the application is in editing mode instead of normal mode. In this case, the widget of GUI 300 pressed by the user does not operate normally. That is, the widget takes no action. For example, if button 312 of GUI 300 was pressed while the application was in editing mode, the application would not proceed to log the user out of the application. Instead, the application would simply not react at all. In step 260, flow 250 ceases.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

A preferred embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 7:
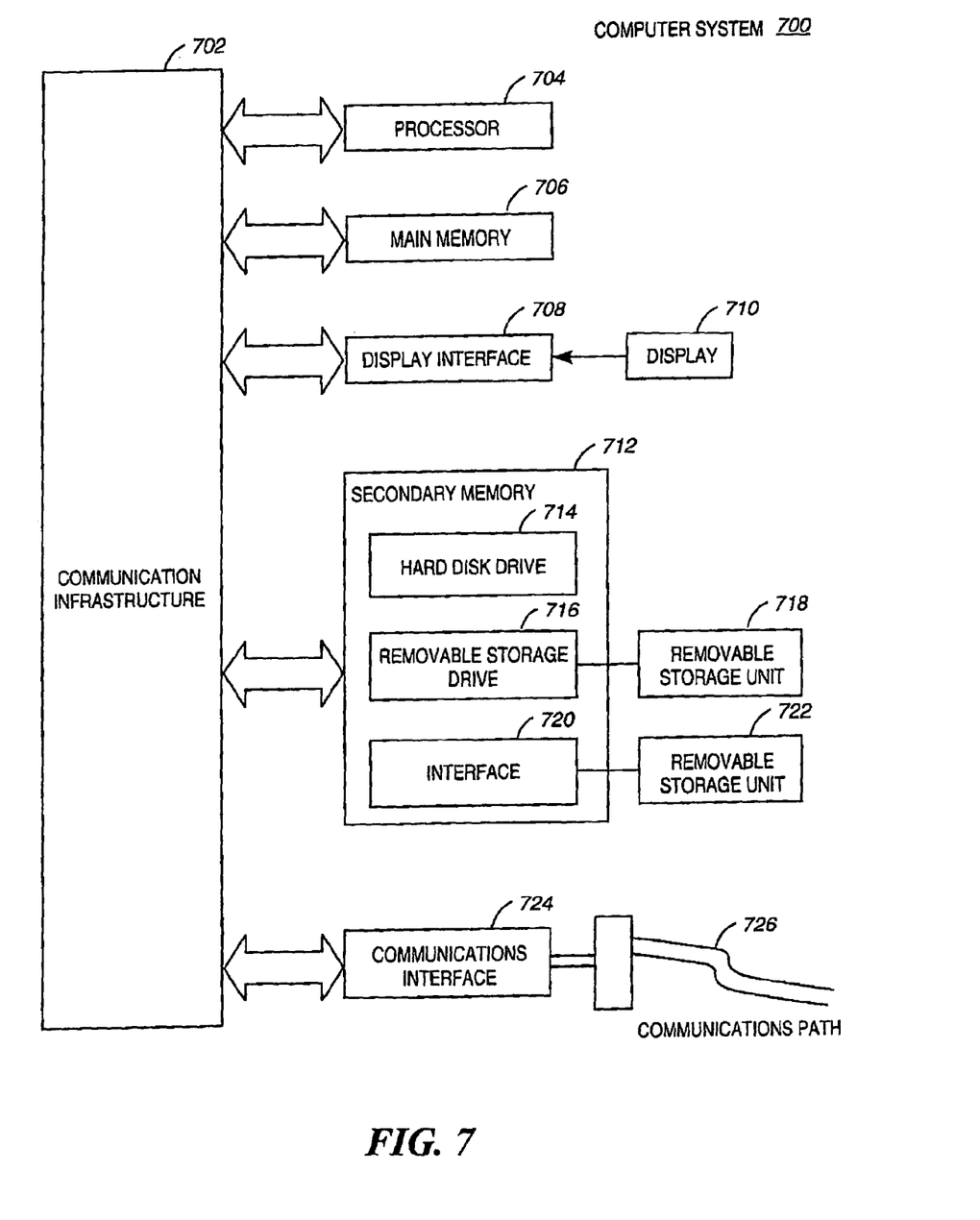
FIG. 7 is a block diagram of an exemplary computer system useful for implementing the present invention.

An example of a computer system 700 is shown in FIG. 7. The computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a manner well known to those having ordinary skill in the art. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative preferred embodiments, the secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be, for example, electronic, electromagnetic, optical, or other signals capable of being received by communications interface 724. These signals 728 are provided to communications interface 724 via a communications path (i.e., channel) 726. This channel 726 carries signals 728 and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 708 and secondary memory 710, removable storage drive 714, a hard disk installed in hard disk drive 712, and signals 728. These computer program products are means for providing software to computer system 700. The computer readable medium allows the computer system 700 to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems 700. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform the features of the computer system 700. Accordingly, such computer programs represent controllers of the computer system 700.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for modifying a graphical user interface (GUI), said method comprising the steps of:
   executing an application that presents a GUI during execution, the GUI including a plurality of widgets associated with the application upon execution of the application;
   providing a toggle widget on the GUI presented by the application during execution of the application presenting the GUI, the toggle widget being provided on the GUI upon execution of the application in addition to the widgets associated with the application;
   detecting pressing of the toggle widget during execution of the application presenting the GUI;
   if pressing of the toggle widget is detected during execution of the application presenting the GUI, placing the executing application in an editing mode that suspends normal functions of all the widgets associated with the application;
   while the executing application is in the editing mode, allowing modification of the location of all the widgets associated with the application;
   detecting pressing of the toggle widget while the executing application is in the editing mode; and
   if pressing of the toggle widget is detected while the executing application is in the editing mode, exiting the editing mode so that modification of the location of any of the widgets associated with the application is no longer allowed and restoring normal functions of all the widgets associated with the application.

2. The method of claim 1,
   wherein in the step of providing a toggle widget, the toggle widget is visible immediately upon execution of the application presenting the GUI, and
   wherein the toggle widget continues to be visible during the entire time that the application presenting the GUI is executing.

3. The method of claim 1, wherein the step of placing comprises immediately placing the executing application in the editing mode when pressing of the toggle widget is detected during execution of the application presenting the GUI, and
   wherein the executing application is only ever placed in the editing mode as a result of pressing the toggle widget.

4. The method of claim 1, wherein the placing step comprises the sub-step of:
   changing the color of the toggle widget.

5. The method of claim 4, wherein the exiting step comprises the sub-step of:
   restoring the color of the toggle widget.

6. The method of claim 1, wherein in the allowing step, the location of a widget associated with the application is modified using one of:
   clicking and dragging the widget; and
   utilizing a keystroke or keystrokes.

7. The method of claim 1, wherein the application is an instant messaging application.

8. A non-transitory computer readable medium including computer instructions for modifying a graphical user interface (GUI), the computer instructions comprising instructions for:
   executing an application that presents a GUI during execution, the GUI including a plurality of widgets associated with the application upon execution of the application;
   providing a toggle widget on the GUI presented by the application during execution of the application presenting the GUI, the toggle widget being provided on the GUI upon execution of the application in addition to the widgets associated with the application;
   detecting pressing of the toggle widget during execution of the application presenting the GUI;
   if pressing of the toggle widget is detected during execution of the application presenting the GUI, placing the executing application in an editing mode that suspends normal functions of all the widgets associated with the application;
   while the executing application is in the editing mode, allowing modification of the location of all the widgets associated with the application;
   detecting pressing of the toggle widget while the executing application is in the editing mode; and
   if pressing of the toggle widget is detected while the executing application is in the editing mode, exiting the editing mode so that modification of the location of any of the widgets associated with the application is no longer allowed, and restoring normal functions of all the widgets associated with the application.

9. The non-transitory computer readable medium of claim 8,
   wherein the instructions for providing comprises making the toggle widget visible immediately upon execution of the application presenting the GUI, and
   wherein the toggle widget continues to be visible during the entire time that the application presenting the GUI is executing.

10. The non-transitory computer readable medium of claim 8, wherein the instructions for placing comprises immediately placing the executing application in the editing mode when pressing of the toggle widget is detected during execution of the application presenting the GUI, and
wherein the executing application is only ever placed in the editing mode as a result of pressing the toggle widget.

11. The non-transitory computer readable medium of claim 8, further comprising instructions for changing the color of the toggle widget if pressing of the toggle widget is detected during execution of the application presenting the GUI.

12. The non-transitory computer readable medium of claim 11, further comprising instructions for restoring the color of the toggle widget if pressing of the toggle widget is detected while the executing application is in the editing mode.

13. The non-transitory computer readable medium of claim 8, wherein the instructions for allowing comprises allowing modification of the location of a widget associated with the application using one of:
clicking and dragging the widget; and
utilizing a keystroke or keystrokes.

14. The non-transitory computer readable medium of claim 13, wherein the instructions for allowing comprises allowing modification of the location of a widget associated with the application to be moved to any location within the viewing area of the GUI.

15. The non-transitory computer readable medium of claim 8, wherein the application is an instant messaging application.

16. The non-transitory computer readable medium of claim 8, wherein the application does not require the simultaneous execution of another application, other than the operating system or a common system library or file, in order to execute properly.

17. A system for modifying a graphical user interface (GUI), said system comprising:
means for executing an application that presents a GUI during execution, the GUI including a plurality of widgets associated with the application upon execution of the application;
means for providing a toggle widget on the GUI presented by the application during execution of the application presenting the GUI, such that the toggle widget is provided on the GUI upon execution of the application in addition to the widgets associated with the application;
means for, during execution of the application presenting the GUI, detecting pressing of the toggle widget;
means for, if pressing of the toggle widget is detected during execution of the application presenting the GUI, placing the executing application in an editing mode that suspends normal functions of all the widgets associated with the application;
means for, while the executing application is in the editing mode, allowing modification of the location of all the widgets associated with the application;
means for detecting pressing of the toggle widget while the executing application is in the editing mode; and
means for, if pressing of the toggle widget is detected while the executing application is in the editing mode, exiting the editing mode so that modification of the location of any of the widgets associated with the application is no longer allowed, and restoring normal functions of all the widgets associated with the application.

18. The system of claim 17, wherein the means for providing comprises providing a GUI with a toggle widget, during execution of an application presenting the GUI, wherein the toggle widget is visible immediately upon execution of the application presenting the GUI and wherein the toggle widget continues to be visible during execution of the application presenting the GUI.

19. The system of claim 17, wherein the means for placing comprises means for immediately placing the executing application in the editing mode when pressing of the toggle widget is detected during execution of the application presenting the GUI, and
wherein the executing application is only ever placed in the editing mode as a result of pressing the toggle widget.

20. The system of claim 17, further comprising means for changing the color of the toggle widget if pressing of the toggle widget is detected during execution of the application presenting the GUI.

21. The system of claim 20, further means for restoring the color of the toggle widget if pressing of the toggle widget is detected while the executing application is in the editing mode.

22. The system of claim 17, wherein the means for allowing comprises means for allowing modification of the location of a widget associated with the application using one of:
clicking and dragging the widget; and
utilizing a keystroke or keystrokes.

23. A method for modifying a graphical user interface (GUI), said method comprising the steps of:
executing an application that presents a GUI during execution, the GUI including a plurality of widgets associated with the application upon execution of the application;
detecting a toggle keystroke during execution of the application presenting the GUI;
if the toggle keystroke is detected during execution of the application presenting the GUI, placing the executing application in an editing mode that suspends normal functions of all the widgets associated with the application;
while the executing application is in the editing mode, allowing modification of the location of all the widgets associated with the application;
detecting the toggle keystroke while the executing application is in the editing mode; and
if pressing of the toggle widget is detected while the executing application is in the editing mode, exiting the editing mode so that modification of the location of any of the widgets associated with the application is no longer allowed, and restoring normal functions of all the widgets associated with the application.

* * * * *